(12) United States Patent
Mansfield (10) Patent No.: US 8,488,599 B2
(45) Date of Patent: Jul. 16, 2013

(54) AUTO-SWITCHING METHOD AND DEVICE FOR DUAL MODE ANALOG-VOIP DEVICE

(75) Inventor: Carl Mansfield, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1407 days.

(21) Appl. No.: 11/559,269

(22) Filed: Nov. 13, 2006

(65) Prior Publication Data

US 2008/0112392 A1    May 15, 2008

(51) Int. Cl.
H04J 3/00    (2006.01)

(52) U.S. Cl.
USPC .......................................................... 370/356

(58) Field of Classification Search
None
See application file for complete search history.

(56) References Cited

U.S. PATENT DOCUMENTS

| | | | |
|---|---|---|---|
| 6,345,047 B1 | 2/2002 | Regnier | |
| 6,563,816 B1 | 5/2003 | Nodoushani et al. | |
| 6,654,456 B1 | 11/2003 | Mandalia et al. | |
| 7,519,362 B2 * | 4/2009 | LaPerch | 455/426.2 |
| 2001/0024436 A1 * | 9/2001 | Barraclough et al. | 370/352 |
| 2003/0035523 A1 * | 2/2003 | Mansfield | 379/93.07 |
| 2003/0142795 A1 * | 7/2003 | Gavette et al. | 379/67.1 |
| 2004/0125819 A1 | 7/2004 | Binder | |
| 2004/0218583 A1 * | 11/2004 | Adan et al. | 370/352 |
| 2006/0239278 A1 * | 10/2006 | Hurst et al. | 370/401 |
| 2007/0223465 A1 * | 9/2007 | Wang et al. | 370/356 |
| 2007/0263854 A1 * | 11/2007 | Ou Yang et al. | 379/413.03 |
| 2008/0144799 A1 * | 6/2008 | Chang et al. | 379/243 |

FOREIGN PATENT DOCUMENTS

| | | |
|---|---|---|
| WO | WO 2004/049655 A1 | 6/2004 |
| WO | WO 2004/082255 A1 | 9/2004 |

OTHER PUBLICATIONS

Author Unknown, Intel LXT974/LXT975 Fast Ethernet 10/100 Quad Transceivers Datasheet, Jan. 2001, pp. 1-75.*

* cited by examiner

Primary Examiner — John Blanton
Assistant Examiner — Christopher Crutchfield
(74) Attorney, Agent, or Firm — Brooks Acordia IP Law, P.C.; Pejman Yedidsion; David Ripma (57) ABSTRACT

The embodiments of the present invention provide for methods, systems, and devices adapted to configure a dual-mode device to the appropriate mode(s). The dual-mode device is adapted to provide analog/POTS service, digital/VoIP service, and multimedia terminal adapter (MTA) service, typically based on the enabled mode(s). A device is also provided providing MTA service to an analog or legacy phone connected to an on-premises phone wiring system via an inactive POTS line.

20 Claims, 6 Drawing Sheets

AUTO-SWITCHING METHOD AND DEVICE FOR DUAL MODE ANALOG-VOIP DEVICE

BACKGROUND

1. Field of the Invention

The present invention, in its several embodiments, generally relates to public switched telephone network/Voice-over-Internet-Protocol telephony and more particularly, the field of endeavor pertains to hybrid analog-VoIP communication and network-interfacing devices and methods of automatic device configuration.

2. Related Art

Analog telephone adapters (ATA) convert analog telephone signals into another format, typically the digital format of the Voice over Internet Protocol (VoIP). The ATA converts both audio, i.e., voice, signals and control signals, e.g., touch tone and hold requests, into formats that may be sent and received via the Internet. In addition to VoIP telephony conversions, the ATA may convert digital signals into audiovisual and data formats and in doing so, may be termed a multimedia terminal adaptor (MTA). Accordingly, an MTA may be used as a telephone terminal adaptor that interfaces analog telephone lines with one or more packet-switched networks.

SUMMARY

In one aspect of the invention, a method of configuring a device—adapted to support analog service comprising plain old telephone system (POTS) service, digital service comprising Voice-over-Internet-Protocol (VoIP) service, and multimedia terminal adapter (MTA) service—is provided. The method includes the steps of: for each analog line, detecting if analog service is active on said analog line; for each digital line, detecting if digital service is active on said digital line; for said each analog line detected with active analog service, disabling said MTA service and enabling said analog service on each of said analog line detected with active analog service; if active digital service is not detected on all said digital lines, disabling said MTA service and disabling digital service on each of said all digital lines detected with no active digital service; for said each digital line detected with active digital service, enabling said digital service on each of said digital lines detected with active digital service; and if at least one analog line is detected with no active analog service and if at least one digital line is detected with active digital service, enabling said MTA service on said at least one analog line detected with no active service and associating said at least one analog line detected with no active service with said at least one digital line detected with active digital service as a source of digital service for MTA service.

In another aspect of the invention, a device, adapted to be operably connected to a phone wiring system and to a network, is provided. The device includes an analog test module, a digital test module, and a configuration module. The analog test module is adapted to detect active analog service, comprising plain old telephone system (POTS) service, on an analog line. The digital test module is adapted to detect active digital service, comprising Voice-over-Internet Protocol (VoIP) service, on a digital line. The configuration module is adapted to: for said each analog line detected with active analog service, disable MTA service and enable said analog service on each of said analog line detected with active analog service; if active digital service is not detected on all said digital lines, disable said MTA service and disable digital service on each of said all digital lines detected with no active digital service; for said each digital line detected with active digital service, enable said digital service on each of said digital line detected with active digital service; and if at least one analog line is detected with no active analog service and if at least one digital line is detected with active digital service, enable MTA service on said at least one analog line detected with no active service and associate said at least one analog line detected with no active service with said at least one digital line detected with active digital service as a source of digital service for MTA service.

In another aspect, a system is provided. The system includes a device, an on-premises phone wiring system operably coupled to the device, and at least one network segment operably coupled to the device, wherein the at least one network segment is adapted to provide Internet access. The device includes an analog test module, a digital test module, and a configuration module. The analog test module is adapted to detect active analog service, comprising plain old telephone system (POTS) service, on an analog line. The digital test module is adapted to detect active digital service, comprising Voice-over-Internet Protocol (VoIP) service, on a digital line. The configuration module is adapted to: for said each analog line detected with active analog service, disable MTA service and enable said analog service on each of said analog line detected with active analog service; if active digital service is not detected on all said digital lines, disable said MTA service and disable digital service on each of said all digital lines detected with no active digital service; for said each digital line detected with active digital service, enable said digital service on each of said digital line detected with active digital service; and if at least one analog line is detected with no active analog service and if at least one digital line is detected with active digital service, enable MTA service on said at least one analog line detected with no active service and associate said at least one analog line detected with no active service with said at least one digital line detected with active digital service as a source of digital service for MTA service.

In another aspect, a method of configuring a device adapted to support multimedia terminal adapter (MTA) service is provided. The device is adapted to be operably connected to at least one analog line via a phone-wiring system and to be operably connected to at least one digital line. The method includes the steps of: for each analog line, detecting if analog service, comprising plain old telephone system (POTS) is active on said analog line; for each digital line, detecting if digital service, comprising Voice-over-Internet-Protocol (VoIP) service, is active on said digital line; and if at least one analog line is detected with no active analog service and if at least one digital line is detected with active digital service, enabling said MTA service on said at least one analog line detected with no active analog service and associating said at least one analog line detected with no active analog service with said at least one digital line detected with active digital service as a source of digital service for said MTA service.

BRIEF DESCRIPTION OF THE DRAWINGS

For a more complete understanding of the present invention and for further features and advantages, reference is now made to the following description taken in conjunction with the accompanying drawings, in which.

DETAILED DESCRIPTION

Figure 1:
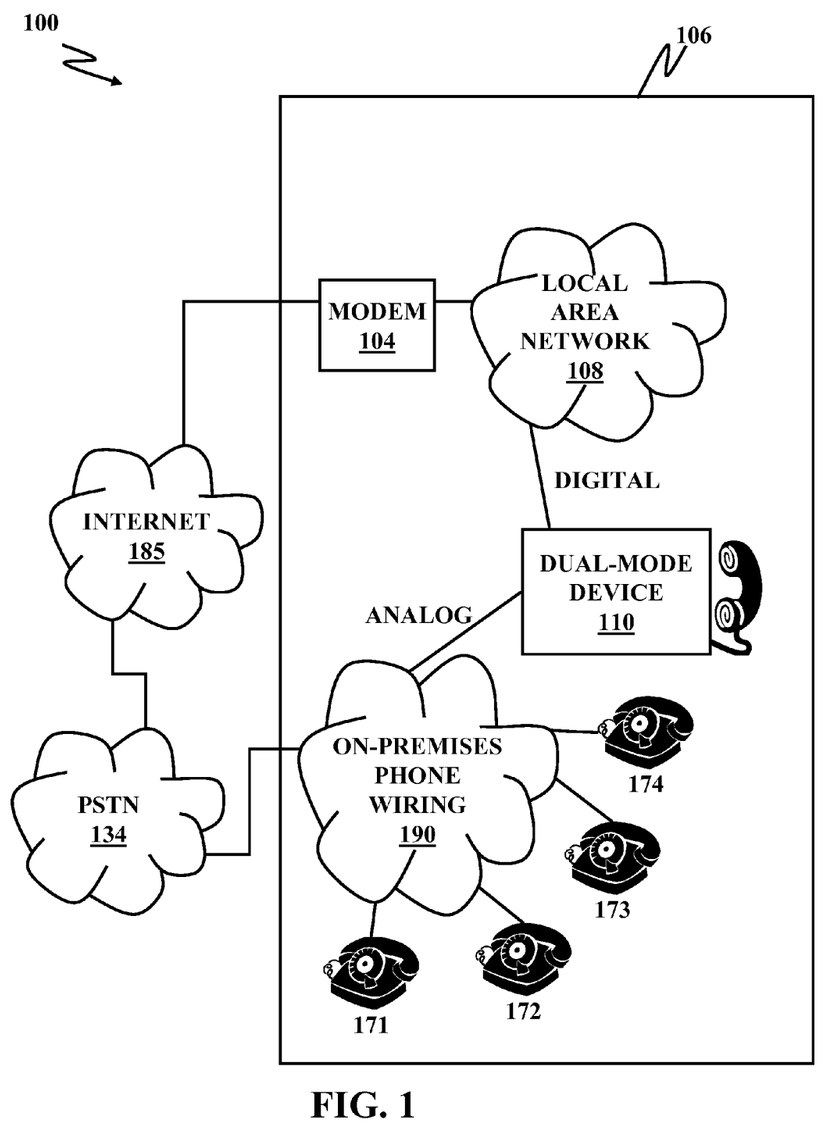
FIG. 1 is a functional block diagram illustrating an exemplary system according to an embodiment of the present invention.
Figure 2:
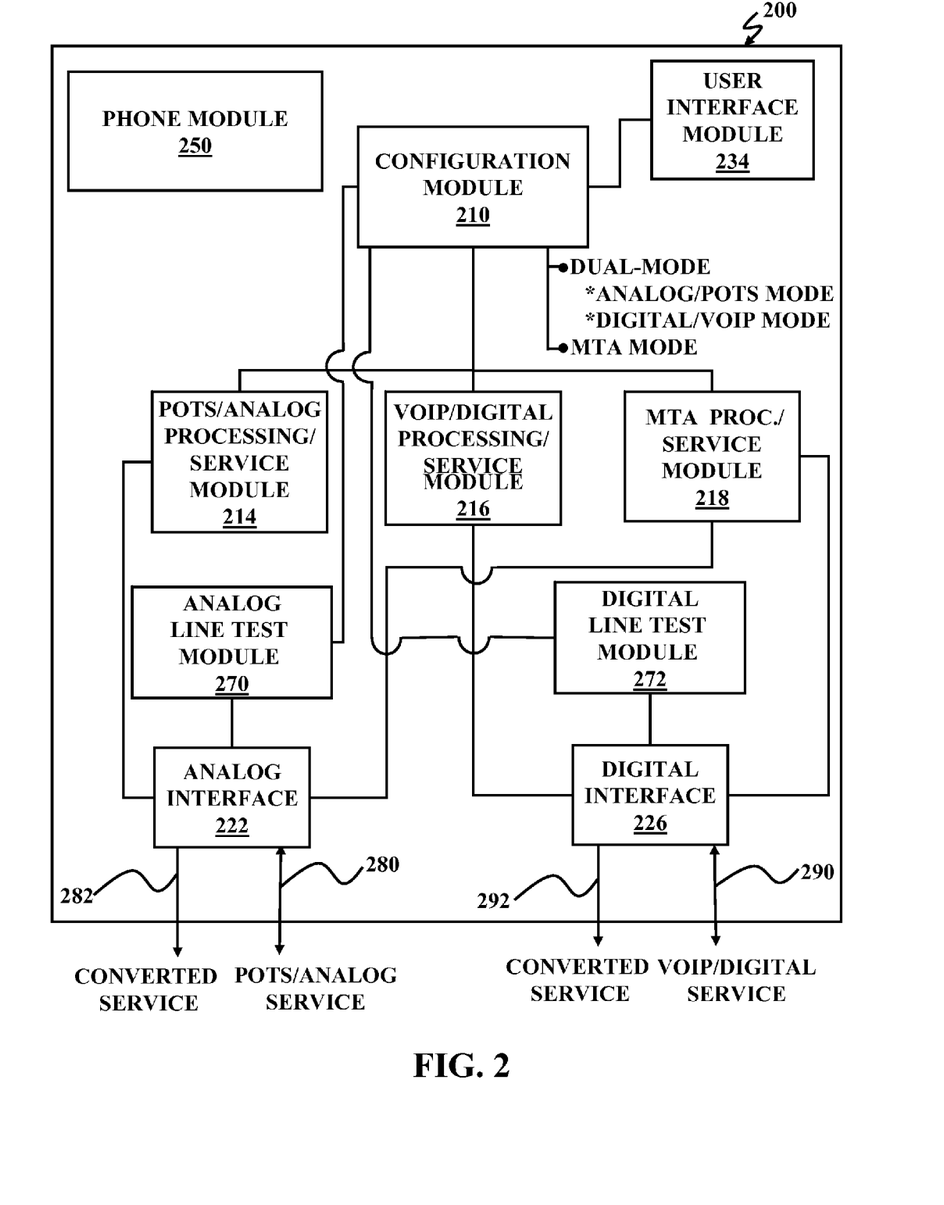
FIG. 2 is a high-level functional block diagram illustrating an exemplary dual-mode analog-VoIP device, with MTA capabilities, according to an embodiment of the present invention.

To better understand the figures, reference numerals within the one hundred series, for example, 134 and 185, are initially introduced in FIG. 1, reference numerals in the two hundred series, for example, 285 and 234, are initially introduced in FIG. 2, and so on and so forth.

FIG. 1 is a high-level exemplary system diagram 100 incorporating at least one analog-Voice-over-Internet-Protocol (VoIP) device 110, which may be deployed, for example, in a home or business environment 106. Voice over Internet Protocol is (VoIP) is generally a technology that converts analog telephone calls into digital packets, which are then transported or transmitted, over the Internet or over a privately owned and managed data network, to their destinations. VoIP is sometimes referred to as Internet telephony, IP telephony, or Voice over the Internet (VOI).

The exemplary analog-VoIP device 110 is embodied as a dual-mode telephony device. The dual-mode device 110 is adapted to support either plain old telephone systems (POTS) service or VoIP service. POTS service is typically via a circuit-switched network, while the VoIP service is typically via a packet-switched network. The dual-mode device 110 in addition to being adapted to function as a telephony device, typically a phone, is also adapted to function as a multimedia terminal adapter (MTA), which includes analog terminal adapter functions. The exemplary system 100 includes a number of POTS analog or legacy handsets 171, 172, 173, 174 connected to the on-premises analog phone wiring system 190, e.g., via phone jacks. The on-premises analog phone wiring system 190 is connected to a public switched telephone system (PSTN) 134 enabling the analog phones 171, 172, 173, 174 to place POTS phone calls—if POTS service is available. The dual-mode analog-VoIP device 110 is connected to the on-premises analog phone wiring system 190, e.g., via a standard phone jack such as an RJ-11 port. The dual-mode analog-VoIP device 110 is also connected to an on-premises data local area network (LAN) 108, which provides the analog-VoIP device 110 with access to the Internet 185 or private data network(s) via a modem 104. VoIP services available on the Internet 185, for example, are thus made available to the analog-VoIP device 110 and, in some circumstances, to the analog handsets 171-174 via this connection to the Internet. In some embodiments, the modem 104 provides a typically always-on broadband access to the Internet 185, such as that provided by a digital subscriber line (DSL) modem or cable modem. In some embodiments, the modem 104 may be an analog "dial-up" modem or a modem supporting some alternate Internet access method, such as optical fiber, broadband terrestrial wireless or satellite-based broadband wireless. In some embodiments, the modem 104 may include additional functionality, such as routing and/or firewalling functions of a residential gateway. The local area network (LAN) may comprise one or more network segments, which may include wired and/or wireless network segments, including, for example, Ethernet, power line communication (PLC), e.g., HOMEPLUG™, and IEEE 802.11. The Internet 185 may also be connected to the PSTN 134 via some form of VoIP gateway device or bridge. The analog-VoIP device 110 is typically connected to an external power source, such as an electric outlet or external batteries. The analog-VoIP device 110 may also have an internal power source, e.g., batteries.

The system 100 in general and the dual-mode analog-VoIP device 110 are adapted to provide VoIP services, as well as POTS services, if available. A user may use the analog-VoIP device to place POTS phone calls or VoIP phone calls, depending on whether such services are available. Furthermore, VoIP services may be provided to POTS phones 171, 172, 173, 174 connected to the on-premises analog phone wiring 190, depending on conditions described herein, in particular, when the analog-VoIP device is set to MTA mode processing. Thus, the analog-VoIP device 110 of the present invention, in addition to being adapted to function as a dual-mode analog phone and a VoIP phone, is also adapted to function as a multimedia terminal adaptor (MTA), including functioning as an analog telephone adapter (ATA), thereby enabling the POTS phones 171, 172, 173, 174 connected to the analog-VoIP device via the on-premises analog telephone wiring system, to access VoIP services, e.g., by converting digital VoIP service to analog service and driving the analog service in the premises. The system 100 is also adapted to enable a user to physically situate POTS phones 171, 172, 173, 174 where POTS phone are typically placed or located. The embodiments of the present invention also provide a dual-mode device that typically automatically configures itself, depending, for example, on the presence of analog POTS service. The user may also be enabled, via a user interface, to select either VoIP or analog service for outgoing calls and for incoming calls. The embodiments of the present invention may be deployed in personal and commercial settings.

FIG. 2 is a high-level block diagram of an exemplary dual-mode analog-VoIP phone device 110, 200 adapted to configure modes, according to an embodiment of the invention. The exemplary dual mode device 200 typically includes a configuration module 210 adapted to enable or disable the appropriate mode(s). The configuration module 210, in some embodiments, is adapted to select both dual modes, i.e., analog or POTS mode and VoIP mode, and, in other embodiments, just one of the dual modes. In other embodiments, the configuration mode module may also select the MTA mode to enable MTA service.

The exemplary dual-mode device 200 may be embodied as a telephonic device. To adapt such device to function as a phone communication device, the dual-mode device 200 may include a phone module 250, which provides an interface for a user to receive and place calls. The user interface module 234 may embody other user interface components, e.g., displays, buttons, and/or keyboards, adapted to enable a user to interface with the dual-mode phone device 200. The phone module 250 may interface, not shown, with one or more modules of the phone device 200, in particular, interfaces to POTS/Analog processing/service module 214 and VoIP/digital processing/service module 216.

The configuration module 210 typically interfaces with a POTS/analog processing/service module 214, a VoIP/digital processing/service module 216, and an MTA processing/service module 218, so as to selectively enable the appropriate service. In general, the POTS/analog processing module 214 is adapted to provide POTS analog service 280, so as to enable a user, for example, to use the dual-mode device as an analog/POTS phone. The VoIP/digital processing module 216 is adapted to enable digital service 290, particularly VoIP service, so as to enable a user, for example, to use the device 200 as a digital/VoIP phone. The MTA module 218 in general is adapted to provide MTA service, for example, provide converted services 28—e.g., VoIP to analog service. The MTA service, in some embodiments, is able to bridge or connect analog or legacy phones connected to the phone wiring system, for example, via a phone jack—instead of directly connected to this device 200—to an active VoIP service, thereby providing converted service 282, 292, as further explained below. In some embodiments, the MTA module may perform some or all of the functions of the VoIP/digital processing service module 216. In some embodiments, the MTA module 218 interfaces with the VoIP processing module 216 to perform its MTA service. In other embodiments, the MTA service module 218 also incorporates a VoIP processing module 216.

The analog line test module 270 in general detects for active POTS or analog service available via the analog interface 222. Analog lines that are supported by an active POTS service are herein also called active POTS line, while lines that are not supported by POTS service are herein also called inactive POTS lines. VERIZON and AT&T are examples of POTS service providers. The digital line test module 272, on the other hand, generally detects for active digital service available via the digital interface 226. In some embodiments, the digital line test module may also process incoming packets to determine the activity, adequacy of quality of service (QOS), or stability of IP ports of the analog-VoIP device 200. In some embodiments, digital line test may be integrated with MTA processing module 218 and/or digital processing module 216.

The various blocks described herein may be embodied as a set of program instructions, e.g., software, hardware, or both, i.e., firmware. For example, the configuration module 210 may be embodied as a set of program instructions executing on a central processor unit (CPU). Furthermore, the various blocks may be further subdivided or combined into one or more modules and still be within the scope of the invention. For example, the configuration module 210 may include the functions of both the analog line test module 270 and the digital line test module 272. Other blocks may also be added to this exemplary telephony device, for example, a controller adapted to handle the overall functions of the dual-mode device.

Figure 3:
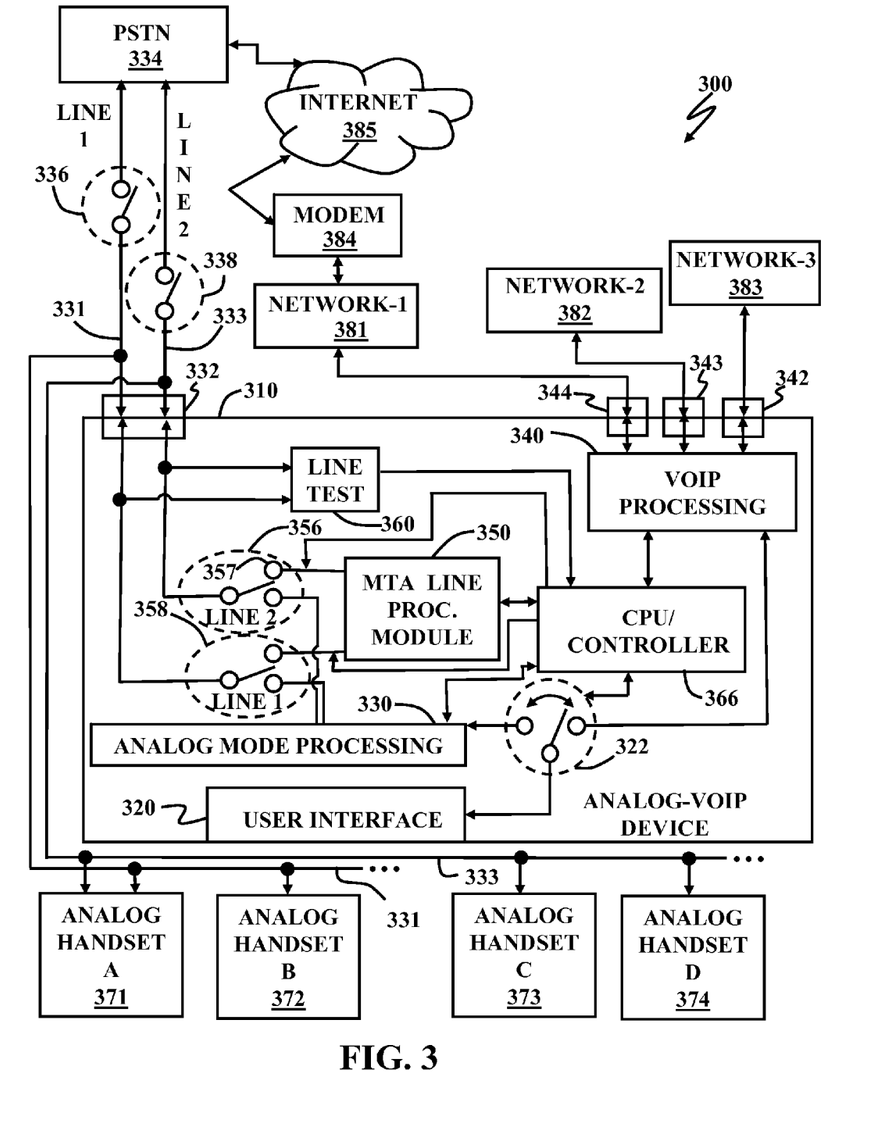
FIG. 3 is a functional block diagram illustrating an exemplary system, including the functional elements of an exemplary dual-mode analog-VoIP device embodiment, according to an embodiment of the present invention.

Illustrated in functional block diagram form in FIG. 3 is another exemplary system 300 incorporating a dual-mode analog-VoIP device 310, 110, 200 embodied as a client dual-mode phone, according to some embodiments of the invention. The exemplary analog-VoIP device 310 includes a user interface 320, an analog signal processing circuitry or processing module 330, a line test module 360, a central processing unit or controller 366, an MTA line processing module 350, and a VoIP processing module 340. The dual-mode device also includes an analog interface 332 and one or more digital interfaces 342-344. The exemplary analog-VoIP device is typically adapted to support analog POTS service, VoIP service, and MTA service.

The exemplary analog-VoIP device 310 may also include a user interface 320. For example, in some embodiments, a user is enabled to select the service type to use, i.e., POTS service or VoIP service, e.g., via a button that sets a switch 322 to either analog or POTS processing 330 or to VoIP processing 340. In other embodiments, not shown, a user may also select the analog line to use, e.g., line 1 331 or line 2 333, via the exemplary user interface 320. Such user interface may include a touch-key pad adapted to receive numeric entries to indicate phone numbers being called. In other embodiments, this user interface may include a display, e.g., a liquid crystal display, adapted to present numeric entries, caller-ID (CLID) numbers, date, time, and memory locations. Such user interface may also include a speaker and a microphone, so as to enable the analog-VoIP device to function also as a phone, whether a POTS phone or a VoIP phone. User interface entries, inputs, or actions, e.g., keypad entries, audio input, on-hook action, and off-hook action are typically converted to signals, for example, to be sent over the POTS line by the analog processing module 330 or to be sent over the VoIP lines by the VoIP processing module 340.

The exemplary analog-VoIP device 310 includes an analog interface, e.g., a port 332, for example an RJ-11 jack or, in this example, an RJ-14 jack supportive of two lines, e.g., line 1 331 and line 2 333, for sending and receiving analog signals, and if connected to the plain old telephone system (POTS), these signals may be transmitted via the public switched telephone network (PSTN) 334. Other embodiments may adopt interface jacks capable of supporting more than two lines, such as RJ-25 or RJ-61. The possible connection to an available and active POTS service of line 1 331 is shown symbolically by a switch 336 and the possible connection to an available and active POTS service of line 2 333 is shown symbolically by a switch 338. Symbolically, line 1 switch 336 is closed when POTS service is available or active and open when POTS service is unavailable. Similarly, line 2 switch 338 is closed when POTS service is available/active and open when POTS service is unavailable/inactive. Irrespective of the closure of the line 1 switch 336 or the line 2 switch 338, either line 1 331 or line 2 333, or both, may be connected via analog segments or wiring to analog handsets 371-374.

The line test module 360 in general functions as a probe and detects for the presence of active POTS service, e.g., determines the electrical connectivity of line 1 331 and line 2 333 to active and available services on the PSTN 334. Symbolically, this is equivalent to line test module 360 detecting the open or closed states of switches 336 and 338. An exemplary method of determining POTS connectivity or service is to test for the presence of the standard POTS DC line voltage on each analog line. Other methods of detecting POTS service may also be implemented by the line test module 360. The analog line test module 270 is typically similar to the line test module 360 of this embodiment. The analog mode processing module 330 performs the functions adapted to support the POTS service via the analog lines 331, 333, which may include receiving a dial tone, receiving a ringing signal, receiving busy signal, presenting an off-hook signal, and presenting an on-hook signal, and in general enabling a user to utilize the analog-VoIP device 310 to function as a phone using the available POTS service. The connection to an active POTS service, via line 1 331, line 2 333, or both, may automatically be determined by the controller 366 typically by interfacing with the line test module 360. The CPU/controller 366, in this exemplary embodiment, may function as a configuration module 210. In some embodiments, a user is enabled to select the POTS line to use, e.g., via the user interface 320.

The analog-VoIP dual-mode device 310, 110, 200 is also adapted to support VoIP service. VoIP signals may be sent and received via a digital interface, e.g., ports 342, 343, 344, over a packet-switched network 381, 382, 383. In general, these ports 342, 343, 344 connecting the analog-VoIP device to one or more networks 381, 382, 383 include or interface with connectivity modules, not shown. Such connectivity modules, depending on network connection, may include Ethernet processing module or wireless processing module—e.g., 802.11a or 802.11g processing module. For example, the one or more network ports 342-344 may include Ethernet RJ-45 jacks and Ethernet transceiver modules or may comprise a Wi-Fi transceiving module with at least one antenna, or a broadband cellular transceiver element with an antenna, for example. Also shown in this exemplary embodiment is a modem 384 interposed between network-1 381 and a representation of the Internet or any other wide area network 385, which may be privately or publicly owned, having transmissions interfacing with the PSTN 334.

The central processing unit (CPU)/controller 366, which may be embodied as a set of program instructions, e.g., software, hardware, or both, typically receives input from both the line test module 360 and the VoIP processing module 340. The VoIP processing module 340 is adapted to detect VoIP service over the various network ports or lines 342, 343, 344. In this exemplary embodiment, the digital line test module 272 is embodied in the VoIP processing module 340. The controller 366 interfacing with the line test module 360 and the VoIP processing module is typically able to determine which analog lines have active POTS service, which network ports or lines have VoIP service and how many VoIP service lines are available on each digital port. Based on the determination of available or active POTS or VoIP service lines, the controller 366 may automatically configure the selector switch 322 to select the appropriate configuration or mode(s) so as to enable the analog-VoIP device 310 to function in the mode consistent, for example, with the incoming or outgoing call. Such selector switch 322 may also be set by a user, e.g., via the user interface 320. The VoIP processing module 340 in general performs the VoIP processing so as to provide VoIP service, such as enable a user to transmit and receive VoIP calls, for example, packetizing data based on appropriate VoIP protocols, digitizing the conversation using an audio codec adapted to digitized and compressed/uncompressed phone conversation data, routing the voice conversations over the Internet or through any other IP-based network, and signaling for appropriate dial tones. In typical embodiments, the VoIP processor 340 may include a CPU comprising a set of program instructions. In other embodiments, the functionality of the CPU 366 as described herein may be integrated within the VoIP processing module as a set of additional program instructions, such alternate embodiments being readily apparent to one of ordinary skill in the art.

The controller 366 in general controls the functions of the analog-VoIP device 310, particularly controlling the analog mode processing module 330, VoIP processing module 340, and the MTA processing module 350. In addition to the analog-VoIP device 310 functioning as a VoIP phone 340 or POTS analog phone 330, as discussed above, the analog-VoIP device 310 also functions as an MTA by combination of the functions of the VoIP processing module 340 with the MTA line processing module 350, thereby generally enabling POTS analog handsets 371, 372, 373, 374 which do not support active POTS service but are indirectly connected to the analog-VoIP device via the on-premises phone wirings to be connected generally to available VoIP services. The handsets 371-374 may be connected to the on-premises phone wirings via phone jacks.

In this exemplary embodiment, the MTA line processing module 350 functions as an analog telephony subscriber line interface circuit. The MTA line processing module 350 provides the output signals to enable an analog phone 371-374 to operate when operably connected to the dual mode device 310. Other functions may include generation of line voltage, ringing current, busy signal, calling line ID/caller ID (CLID) signals and detection of events such as on-hook and off-hook. The MTA line module 350 may also perform the VoIP-to-analog conversions and analog-to VoIP conversions, e.g., so as to convert VoIP service received over a LAN segment to analog POTS telephony service. The MTA service provided thereby bridges or connects the analog handsets or telephones 371-374 to VoIP networks, so as to enable such analog handsets 371-374 to communicate via VoIP telephony. Such MTA service for incoming calls, for example, may include: detecting an incoming VoIP call, via the VoIP processing module 340, and drive ringing tones through the on-premises analog telephone wiring 331, 333, enabling the POTS handsets 371, 372, 373, 374 to ring; extracting the CLID from the incoming call's VoIP signaling and translate such signals to CLID signaling used in analog phone lines thereby enabling the CLID to be displayed in analog handsets display, if available; detecting when an analog handset goes off-hook and connecting that analog line to the incoming VoIP call and transcoding VoIP digital voice format to analog format; and detecting when an analog handset goes on-hook and initiating VoIP signaling to terminate the VoIP call. MTA service, for outgoing calls for example, may include: detecting when an analog phone goes off-hook and generating a dial tone onto the analog line; receiving dialed digits from analog lines, e.g., pulse or tone, and converting such signals into a digital format for dialed digits, then initiating the VoIP signaling process to initiate VoIP call setup; detecting when a remote phone is ringing and generating ringing tones onto the analog line; when a remote phone answers, transcoding from VoIP format to analog voice format to bridge the audio from the analog line to VoIP service; and detecting when the analog phone or remote phone hangs up and terminates the VoIP call. Thus, the MTA line processing module 350, in combination with VoIP processing module 340, provide service typical of conventional MTA devices. Other service/functions may also be supported, e.g., support conversion of other call features, such as call waiting-converting VoIP signaling to analog signaling, for example. One of ordinary skill in the art will appreciate the various functions and features provided by an MTA.

Depending on the presence of inactive PSTN lines, i.e., analog lines with no active POTS service, and the presence of VoIP services, the controller 366 in general switches 356, 358 the analog lines 331, 333 to either analog-mode processing 330 or MTA processing 350. Such line processing transfer control by the controller 366 is symbolically represented by having the appropriate switches 356, 358 switched to either analog mode processing 330 or MTA processing 350.

For exemplification purposes, let us assume that the analog-VoIP device 310 supports both analog POTS service and a VoIP service. Line 1 331 supports an active POTS service and the connection to port/line 344 supports a VoIP service. Analog line 2 333, however, is not supported by an active POTS service, thus analog handsets C and D 373, 374, although connected to the on-premises phone wiring system at line 2, are not able to send or receive POTS service calls. Analog handset B 372 and line 1 of analog handset A 371 are able to send and receive POTS service calls via analog line 1.

Line 2 of analog handset A 371, which is a dual-line handset, is not supported by a POTS service. Although ports 343 and 342 are connected to active networks 382, 383, these two ports do not support VoIP service.

For outgoing calls using the voice user interface 320 of the device 310, for example, a user may manually select either analog/POTS—through line 1 331—or digital (VoIP) processing-through port 344, e.g., by toggling a button on the user interface 320 thereby appropriately setting the switch 322 to the proper processing module. In some embodiments, this analog or digital mode processing may automatically be selected by some programmed conditions, e.g., policies or user preferences, or configured by the controller 366. Such policies may be based, for example, on sound quality, availability of quality of service (QOS), calling charges that may be incurred, or destination of the call to be made. For example, for incoming calls, the analog-VoIP device 310, particularly the controller 366, typically automatically detects whether the incoming call is coming in via the analog line 331 or via the VoIP line 344 and automatically sets the switch 322 consistent with the incoming call, i.e., set the switch to analog mode processing 330 if the call is via the POTS line 331 or to VoIP processing 340 if the call is via the VoIP line 344.

Continuing with the prior example, in addition to being a phone, the analog-VoIP device 310, particularly the controller, may set the switch 356 to MTA line processing 350 thereby connecting analog handsets with no active POTS service, e.g., line 2 of analog handset A 371, and analog handsets C 373 and D 374, to the available VoIP service line via port 344. Exemplary switch 358 of line 1 is thus set to analog or POTS mode processing 330, while exemplary switch 356 of line 2 is set to MTA line processing module 350, 357.

In some embodiments, the analog-VoIP device 310 may draw power from an AC network and both (a) convert the power form to DC for use in powering the analog-VoIP device 110, 200, 310 and driving/powering the analog telephones 371-374, if any, and (b) transmit and receive signals via the AC connection in place or in addition to the one or more network ports 342, 343, 344. Other methods of providing and driving the analog lines may also be implemented.

In some embodiments, following the configuration of one or more analog handsets—that may electrically be connected to the analog-VoIP device 110, 200, 310, the analog-VoIP device 110, 200, 310 may test ring each of the VoIP-supported analog handsets and if answered by a user, the analog handset under test may present a message, such as announcing the configuration status or operating mode of the analog-VoIP device 110, 200, 310.

In some embodiments, the analog-VoIP device 110, 200, 310 may embody other functions and features. For example, the analog-VoIP device may, in addition to being a phone, also function as a facsimile machine such that faxed documents may be transmitted over converted digital lines or converted service, e.g., VoIP when the line has no active POTS service. This converted service is made available to the inactive POTS line by the MTA processing module.

Figure 4:
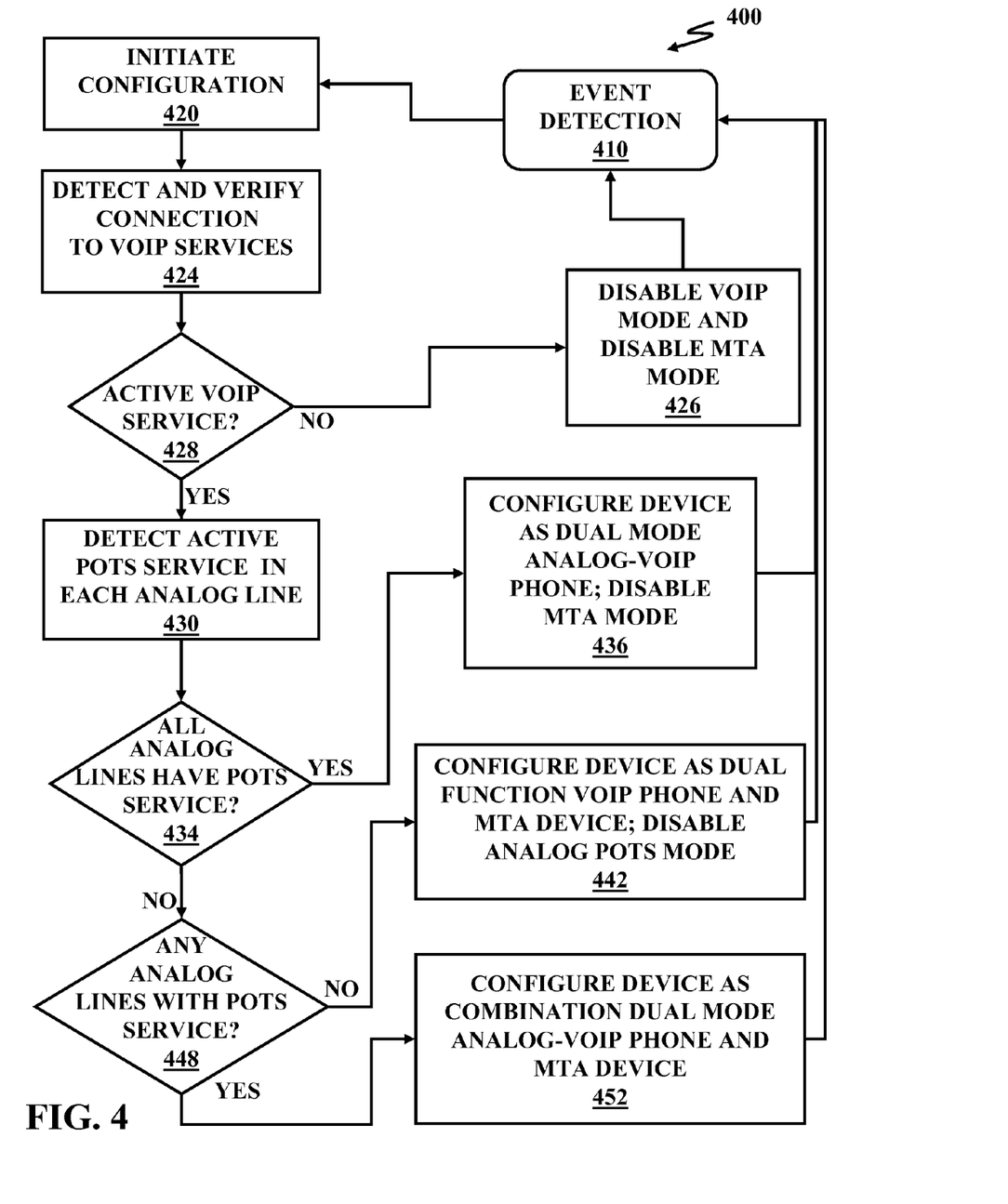
FIG. 4 is a high-level flowchart showing an exemplary self-configuration process of the exemplary dual-mode device, according to an embodiment of the present invention.

FIG. 4 illustrates in a very high level block diagram an exemplary process 400 by which the analog-VoIP device 110, 200, 310 configures its MTA mode of operation, thereby enabling legacy handsets/phones 171-174, 371-374 connected to inactive POTS lines of the phone wiring system to be connected to available VoIP service lines, as well as providing POTS/analog service and/or VoIP/digital service, if available. An exemplary detection event 410 may include the powering up of the analog-VoIP device, a time-based threshold event, e.g., a periodic system check based on, for example, an internal time, a user request, for example via the keypad of an exemplary user interface 320, when a change in connected analog POTS service is detected by a line tester 360, 270, for example, detection of POTS service available on a analog line which formerly had no service available, or detection of removal of POTS service on an analog line which formerly had an available analog service, or for example when a VoIP service is removed or a new VoIP service is added detected by the VoIP processing module 340 or by the digital line test module 272. The test event detection 410 process may be performed by the configuration module 210 interfacing with other modules within the dual-mode device, e.g., the analog line test module 270 and the digital line test module 272, or be performed by another separate module, typically interfacing with other modules within the device 110, 200, 310, Depending on the test for event detection 410, a process for automatic mode determination or operational self-configuring may be initiated (step 420). In the next operation, active connections to VoIP services are determined or detected, via the exemplary digital interface or ports 226, 342, 343, 344, by a digital line test module 272 which may be embodied as a VoIP processor 340 (step 424). Typically, each digital port is checked for active VoIP service. Active digital line testing or detection may be performed, for example, by testing receipt of IP packets conforming to VoIP protocols on the appropriate digital ports.

The results of such active VoIP detection are typically provided directly or indirectly to the configuration module 210. If no active VoIP/digital service is detected (step 428), the configuration module 210 may then disable or deselect the VoIP service mode and also deselects the MTA mode (step 426). Such disabling process may be performed in a number of ways, for example, by setting appropriate switches, having the VoIP processing module read a certain flag or memory space indicating whether VoIP processing is to be performed, and the like. In general, having a mode disabled means that the service associated with that mode is not provided or is not made available. For example, if the VoIP mode is disabled, VoIP service is not provided, thus, a user is not enabled to use the device as a VoIP phone. If the MTA mode is disabled, MTA service is not provided. The dual-mode device typically retains its configuration, e.g., disabled MTA and VoIP mode, until another configuration process is performed as shown.

If active VoIP service is available, the analog line test module 270, 360 may then detect if POTS service is available on each analog/POTS line (step 430). The results of such detection are also typically provided, directly or indirectly, to the configuration module 210. In some embodiments, the line test module 270 may update a line status table that the configuration module 210 reads to determine active or inactive POTS status of each line. Based on such results, the configuration module 210 then determines if all analog lines have active POTS service (step 434). If all analog lines have POTS service, then the configuration module 210 configures the device as a dual-mode analog-VoIP device, i.e., enables the VoIP/digital mode and the POTS/analog mode (step 436). The MTA mode, however, is not enabled (step 436). The dual-mode device at this point is enabled to provide POTS service, similar to traditional POTS service, on all analog lines considering that all analog lines have active POTS service, and is also enabled to provide VoIP on the detected active VoIP lines or ports. These modes may be reconfigured if another event occurs initiating another configuration, as shown.

Based on the results typically of the analog line test module and the digital line test module, the configuration module 210 may then configure the dual-mode device, such that if none of the analog lines have active POTS/analog service and there is an active VoIP/digital service (step 448, "no" branch), the VoIP/digital mode and the MTA mode are enabled, while the analog/POTS mode is disabled (step 442). The active digital lines thus may be used as a medium to place VoIP phone calls, as well as be a source of active VoIP service for MTA service. By setting the MTA mode, each inactive POTS line may be operably connected to an active VoIP service source so as to enable MTA processing. For example, in the MTA mode, the exemplary inactive POTS line 2 333 may be connected to the available active VoIP line/port 344 for MTA service.

On the other hand, if at least one analog line has an active POTS service and there is an active VoIP/digital service (step 448, "yes" branch), the configuration module 210 may then configure the device in dual mode, i.e., enable VoIP/digital mode and enable POTS/analog mode (step 452). The MTA mode is also enabled (step 452).

Table I below lists exemplary capabilities of an exemplary analog-VoIP device embodied as a dual-mode phone 110, 200, 310, according to embodiments of the invention. Referring to FIG. 3, an active POTS line is symbolically represented by having the appropriate switch 336, 338 closed. Switch 356, 358 may be set to either analog mode processing 330 (analog/POTS mode) or MTA mode. In this exemplary embodiment, each port 342, 343, 344 supporting active VoIP service is deemed a VoIP line. For example, if all the ports 342, 343, 344 support VoIP, there are three VoIP lines; if only the first port 344 supports VoIP, there is only one VoIP line. It should be noted that embodiments with more than one VoIP line available on a single digital port are also possible.

TABLE I

| Switch Status | | # of | Exemplary Actions Taken: ANALOG/POTS Mode Processing or MTA Mode Processing | | | |
|---|---|---|---|---|---|---|
| Switch 336 Line 1 | Switch 338 Line 2 | Active VoIP Lines | Switch 358 (Line 1) Set to: | Switch 356 (Line 2) Set to: | MTA module Actions | Exemplary Resulting Capabilities |
| ANY | ANY | NONE | Analog Mode Proc. | Analog Mode Proc. | NONE | The analog-VoIP device dual-mode phone 110, 200, 310 behaves as an analog phone only. POTS services are available to this device 110, 200, 310 and to other POTS analog phones 371-374 typically depending on the manner in which these POTS phones are connected to the phone wiring system. |
| OPEN (No POTS Service) | OPEN | 1, e.g., via port 344 (VoIP Line 1) | MTA Mode Proc. | (Case b Option): MTA Mode Proc. | Converts VoIP Line 1 input to output on POTS Line 1 via switch 358 Optionally (case b): may also convert VoIP Line 1 input to output on POTS line 2 via switch 356 | The dual-mode device typically accesses digital services, e.g., VoIP, only. These digital services are also available to POTS phones connected to the phone wiring system. In the case where the dual-mode phone drives both Lines 1 and 2 (case (b)), this digital access is regardless of whether the POTS phones are connected via analog Line 1 or Line 2. |
| CLOSED (With POTS Service) | OPEN | 1 | Analog Mode Proc. | MTA Mode Proc. | Converts VoIP line 1 input to output on POTS line 2 via switch 356 | The dual-mode phone 110, 200, 310 is able to access digital or analog services in an integrated manner by the appropriate setting of the switch 322. Furthermore, POTS phones (171-174, 371-374) may access a) POTS if connected to Line 1 b) Converted digital services (VoIP) if connected to Line 2 c) POTS and converted digital services if the POTS phone has both Line 1 and Line 2 support. |

TABLE I-continued

Exemplary Actions Taken:
ANALOG/POTS Mode Processing
or MTA Mode Processing

| Switch Status | | # of | Switch | Switch | | |
|---|---|---|---|---|---|---|
| Switch 336 Line 1 | Switch 338 Line 2 | Active VoIP Lines | 358 (Line 1) Set to: | 356 (Line 2) Set to: | MTA module Actions | Exemplary Resulting Capabilities |
| OPEN | CLOSED | 1 | MTA Mode Proc. | Analog Mode Proc. | Converts VoIP line 1 input to output on POTS line 1 via switch 358 | The dual-mode phone is able to access digital or analog services in an integrated manner by the appropriate setting of the switch 322. POTS phones (171-174, 371-374) may access a) POTS if connected to Line 2 b) Converted digital services (VoIP) if connected to Line 1 c) POTS and converted digital services if the POTS phone has Line 1 and Line 2 support. |
| CLOSED | CLOSED | 1+ | Analog Mode Proc. | Analog Mode Proc. | None | The dual-mode phone integrates VoIP (1+ VoIP lines) and analog services in an integrated manner by the appropriate setting of the switch 322. POTS phones may only access analog POTS services. NOTE: In some embodiments, the dual-mode phone may only be adapted to handle one analog line, in which case, the dual-mode phone may only access VoIP + POTS Line 1 or VoIP + POTS line 2. |
| OPEN | OPEN | 2 (e.g., via ports 344 and 343) | MTA Module | MTA module | Converts VoIP line 1 input to output on POTS line 1 via switch 358 and converts VoIP line 2 input to output on POTS line 2 via switch 356 E.g., VoIP line 1 may be mapped to POTS line 2 and VoIP line 2 may be mapped to POTS line 1. In other embodiments, the user may choose to map a single VoIP line to both POTS lines. | The dual-mode phone may only access digital services via VoIP Line 1 and Line 2. POTS phones may access digital services (VoIP) of one or other of the digital lines typically depending on which circuit the POTS phones are connected to and how the digital lines are mapped to the analog circuits. A two-line analog POTS phone may access both VoIP lines, via analog Line 1 and Line 2. |

TABLE I-continued

Exemplary Actions Taken:
ANALOG/POTS Mode Processing
or MTA Mode Processing

| Switch Status | | # of | Switch | Switch | | |
|---|---|---|---|---|---|---|
| Switch 336 Line 1 | Switch 338 Line 2 | Active VoIP Lines | 358 (Line 1) Set to: | 356 (Line 2) Set to: | MTA module Actions | Exemplary Resulting Capabilities |
| closed | open | 2+ | Analog Mode Proc. | MTA Mode Proc. | Converts one of the available VoIP lines to output on POTS line 2 via switch 356 The user may determine which VoIP line is selected from those available; it is also possible for the system to dynamically select this mapping. | The dual-mode phone may access digital lines (2+ lines) or analog Line 1 services in an integrated manner by the appropriate setting of the switch 322. POTS phones may access a) POTS if connected to Line 1 b) The converted digital line (VoIP) if connected to Line 2 c) POTS and the converted digital line if the POTS phone has a two-line support. |
| open | closed | 2+ | MTA Mode Proc. | Analog Mode Proc. | Converts one of the available VoIP lines to output on POTS line 1 via switch 358 The user may determine which VOIP line is selected from those available; it is also possible for the system to dynamically select this mapping. | The dual-mode phone may access digital lines (2+ lines) or analog Line 1 services in an integrated manner by the appropriate setting of the switch 322. POTS phones may access a) POTS if connected to Line 2 b) The converted digital line if connected to Line 1 c) POTS and the converted digital line if the POTS phone has two-line support. |
| Open | Open | 3+ | MTA Mode Proc. | MTA Mode Proc. | Converts one of the available VoIP lines to output on POTS line 1 via switch 358 and another of the available VoIP lines to output on POTS line 2 via switch 356 The user may determine which VoIP lines are selected for mapping from those available; a single VoIP line could be mapped to both POTS lines. It is also possible for the system to dynamically select this mapping. | The dual-mode phone may only access digital services via VoIP lines 1 through 3+. POTS phones may access digital services (VoIP) of one or more of the digital lines typically depending on which circuit the POTS phones are connected to and how the digital lines are mapped to the analog circuits. A two-line analog POTS phone may access two VoIP lines. |

Figure 5:
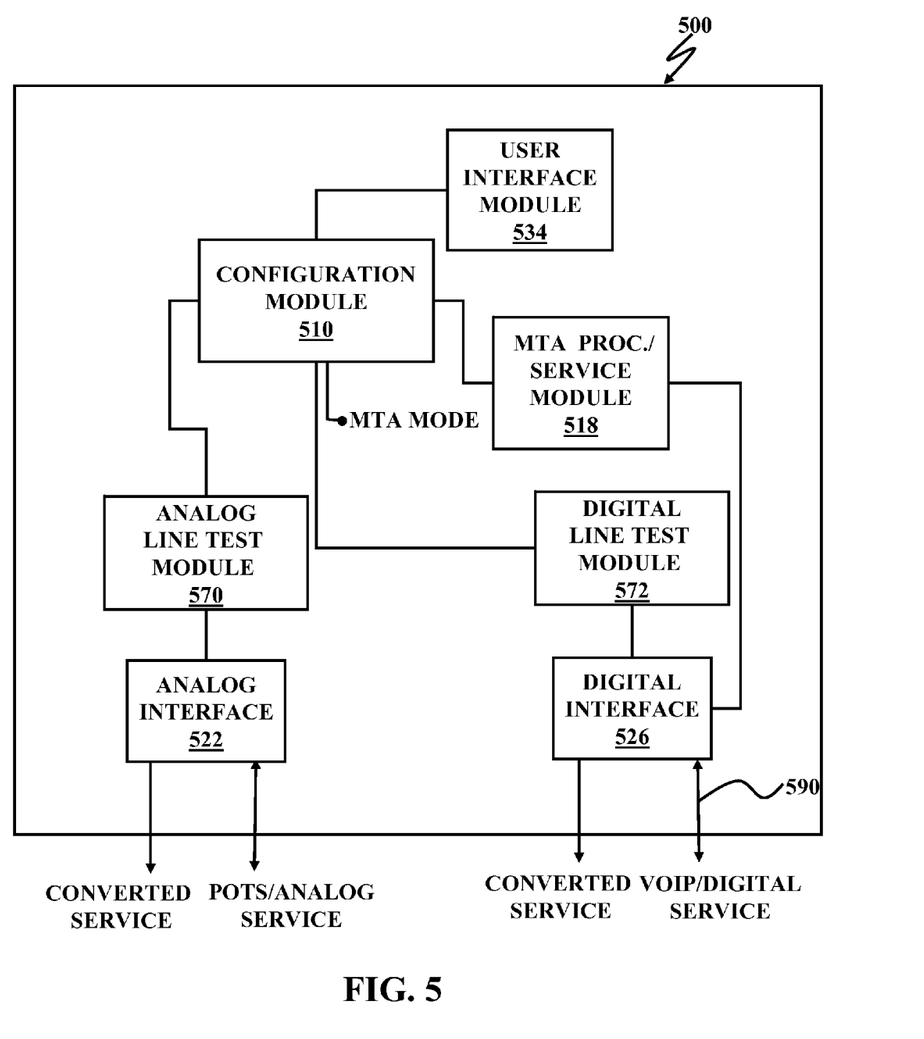
FIG. 5 is a high-level function block diagram of an exemplary multimedia terminal adapter (MTA) device adapted to self-configure, according to an embodiment of the present invention.

FIG. 5 is another diagram of an exemplary self-configurable MTA device 500 according to an embodiment of the invention. This exemplary device 500 is similar to that in FIG. 2, but without the phone feature, i.e., the exemplary device generally functions as a stand-alone MTA and is not adapted to be used as a phone. This exemplary device 500 enables analog or legacy phones connected, via phone jacks, to the on-premises phone wiring system to connect to active VoIP service, if available. Furthermore, the exemplary MTA device 500 self-configures to accordingly enable or disable the MTA mode.

The exemplary MTA device 500 includes a configuration module 510 that typically interfaces with an analog line test module 570 and a digital line test module 572. The analog line test module 570, similar to FIG. 2, detects for active analog/POTS via the analog interface 522. The active digital line test module 572, similar to FIG. 2, detects or determines if a port has an active VoIP/digital service 590 via the digital interface 526. The detection results of these two modules 570 and 572 are typically provided to the configuration mode module, so as to enable the configuration mode module 510 to enable or disable the MTA mode. When the MTA mode is enabled, the MTA processing/service module 518 is enabled to provide MTA service, including appropriate VoIP processing service as part of its MTA service, to the appropriate inactive analog line. If disabled, MTA service is not provided. Typically, the MTA processing module 518 may contain or may interface with a VoIP service module (not shown). The exemplary MTA processing/service module 518, for example, may be embodied as a combination of the MTA line processing module 350 and the VoIP processing module 340 as exemplified and discussed in FIG. 3 above. The user interface module 534 enables a user to interface with the exemplary MTA device 500, for example, as a display informing a user that the MTA mode is enabled.

Figure 6:
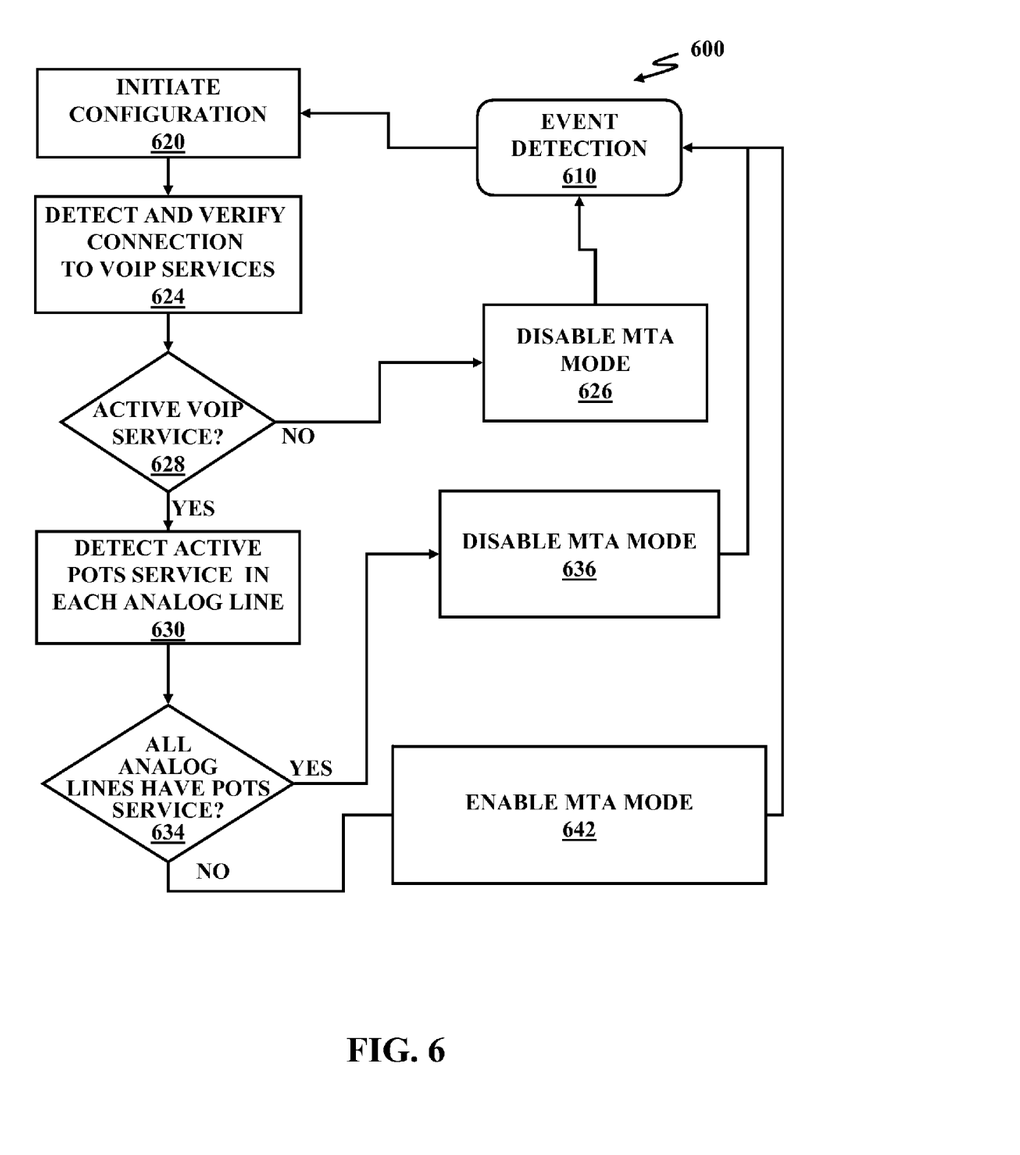
FIG. 6 is a high-level flowchart of an exemplary self-configuration process of the exemplary MTA device, according to an embodiment of the present invention.

FIG. 6 is a high-level exemplary flowchart 600 showing a manner in which a configuration module enables or disables the MTA mode, and accordingly MTA service. Similar to FIG. 4, an event may be detected 610 that initiates the configuration process 620. In the first operation, a digital line test module may determine or detect for active VoIP services (step 624). Based on such detection results, if no active VoIP service is detected (step 628) typically in any of the ports, the configuration module disables the MTA mode (step 626). The analog line test module may then detect each analog line for active POTS/analog service (step 630). If all analog lines have active POTS service (step 634, "yes" branch), the MTA mode is disabled, thereby not providing MTA service to those active POTS lines (step 636). On the other hand, if not all analog lines have active POTS service, i.e., at least one line is an inactive POTS line (step 634, "no" branch), the MTA mode is enabled (step 642).

The embodiments of the invention may also be helpful during emergency or security situations. For example, an alarm system, connected to a POTS phone that is adapted to automatically place a call to a local security company when the alarm is triggered may be unable to place the call due to the POTS service being down. The POTS service may be down, for example, because of damaged or cut external phone wires due to inclement weather conditions. The embodiments of the present invention alleviate these situations by providing the alarm system an alternative communication service, e.g., VoIP rather than POTS service. Furthermore, the analog-VoIP device may include an auxiliary broadband wireless digital port and interface to communicate with the Internet. For example, the analog-VoIP device may have a built-in wireless broadband modem that is automatically initiated when main power to the device is interrupted, e.g., due to power outage. Assuming that the analog-VoIP device is powered by a back-up battery or power supply, a user may be able to communicate via VoIP using a POTS phone even when the POTS service, the wired broadband service, e.g., cable or DSL, and electrical power from the power grid are all unavailable. The analog-VoIP device may drive one of the analog lines and enable communication to the Internet and to the PSTN via the wireless broadband modem.

The embodiments of the invention thus enable a user to pick up a POTS phone connected to the on-premises analog phone wiring and placing a call via VoIP even when the POTS phone has no electrical connectivity to the PSTN and no POTS service. Other VoIP data, e.g., facsimile data, may also be communicated via the analog and digital lines.

Embodiments of the present invention may be used in conjunction with other networks, systems, and devices. Although this invention has been disclosed in the context of certain embodiments and examples, it will be understood by those or ordinary skill in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of ordinary skill in the art based upon this disclosure. For example, the various modules described herein, e.g., in FIGS. 2, 3, and 5, may be combined into one module to perform some or all functions of the various modules. Furthermore, the modules described herein may be further subdivided and combined with other functions so long as the function and processes described herein may be performed. The various modules may also be implemented in hardware, software, or both, i.e., firmware. It is also contemplated that various combinations or subcombinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above.

I claim:

1. A method of configuring a device adapted to support analog service comprising plain old telephone system (POTS) service, digital service comprising Voice-over-Internet Protocol (VoIP) service, and multimedia terminal adapter (MTA) service, the method comprising:
   updating a line status table, wherein content of the line status table is updated via:
      for each analog line, detecting if analog service is active on said analog line; and
      for each digital line, detecting if digital service is active on said digital line;
   for said each analog line detected with active analog service, disabling said MTA service and enabling said analog service on each of said analog line detected with active analog service;
   disabling said MTA service and disabling digital service on each of said all digital lines detected with no active digital service if, based on the updated line status table, active digital service is not detected on all said digital lines;

for said each digital line detected with active digital service, enabling said digital service on each of said digital lines detected with active digital service; and enabling said MTA service on said at least one analog line detected with no active service and associating, via setting an MTA mode, said at least one analog line detected with no active service with said at least one digital line detected with active digital service as a source of digital service for MTA service if, based on the updated line status table, at least one analog line is detected with no active analog service and if at least one digital line is detected with active digital service, and wherein the associating establishes an operable connection between said at least one analog line detected with no active service and said at least one digital line detected with active digital service.

2. The method of claim 1, further comprising the step of:
if at least one analog line is detected with no active analog service and if at least one digital line is detected with active digital service, receiving input assigning which of said at least one digital line detected with active digital service is to be source of digital service for MTA service for said at least one analog line detected with no active service.

3. The method of claim 1, further comprising the step of:
if at least one digital line is detected with active digital service and if at least one analog line is detected with active analog service, receiving line selection input, indicating which line is to be connected to provide a telephonic connection line, wherein the telephonic connection line is one selected from said at least one digital line detected with active digital service and from said at least one analog line detected with active analog service.

4. The method of claim 1, further comprising the step of:
if at least two digital lines are detected with active digital service and if one analog line is detected with no active analog service, receiving input indicating which line of the at least two digital lines detected with active digital service is to provide digital service for MTA service to said one analog line detected with no active analog service.

5. The method of claim 1, further comprising the step of:
if there are more or equal number of digital lines detected with active digital service as compared to analog lines determined to have no active analog service, assigning each of said analog lines determined to have no active analog service to a corresponding digital line selected for said more or equal number of digital lines detected with active digital service.

6. The method of claim 1, further comprising the step of:
if a first analog line and a second analog line are each detected with no active analog service and if a first digital line and a second digital line are each detected with active digital service, assigning the first analog line to the first digital line as a source to provide digital service for MTA service and assigning the second analog line to the second digital line as a source to provide digital service for MTA service.

7. The method of claim 1, further comprising the step of:
transmitting a ringing signal to an analog line; and
if an off-hook signal is detected:
  if said analog line is detected with no active analog service, based on the updated line status table, and if there is at least one digital line with active digital service, transmitting a message indicating digital service is being applied; and
  if said analog line is detected with active analog service, transmitting a message indicating analog service is being applied.

8. The method of claim 1, further comprising the step of:
receiving a call via the at least one digital line detected with active digital service;
if at least one analog line is detected with no active analog service, enabling MTA service on said at least one analog line and connecting said call to the at least one analog line detected with no active analog service.

9. The method of claim 1 wherein the updated line status table comprises a POTS status of each analog line.

10. A device, adapted to be operably connected to a phone wiring system and to a network, comprising:
an analog test module comprising a processor and an updated analog line status table, wherein the updated analog line status table comprises two or more accessible memory locations, the analog test module adapted to detect active analog service, comprising plain old telephone system (POTS) service, on an analog line;
a digital test module, comprising a processor and an updated digital line status table, wherein the updated digital line status table comprises two or more accessible memory locations, the digital test module adapted to detect active digital service, comprising Voice-over-Internet Protocol (VoIP) service, on a digital line; and
a configuration module, comprising a controller, adapted to:
  for said each analog line detected with active analog service, disable multimedia terminal adapter (MTA) service and enable said analog service on each of said analog line detected with active analog service;
  disable said MTA service and disable digital service on each of said all digital lines detected with no active digital service if, based on the updated digital line status table, said active digital service is not detected on all said digital lines;
  for said each digital line detected with active digital service, enable said digital service on each of said digital line detected with active digital service; and
  enable MTA service on said at least one analog line detected with no active service and associate, via setting an MTA mode, said at least one analog line detected with no active service with said at least one digital line detected with active digital service as a source of digital service for MTA service if, based on the updated analog line status table and the updated digital line status table, at least one analog line is detected with no active analog service and if at least one digital line is detected with active digital service, and wherein the association establishes an operable connection between said at least one analog line detected with no active service and said at least one digital line detected with active digital service.

11. The device of claim 10 further comprising:
a wireless modem adapted to support digital service on at least one digital line.

12. The device of claim 10 wherein the configuration module is further adapted to:
if at least one analog line is detected with no active analog service and if at least one digital line is detected with active digital service, receive input assigning which of said at least one digital line detected with active digital service is to be source of digital service for MTA service for said at least one analog line detected with no active service.

13. The device of claim 10 wherein the configuration module is further adapted to:
if at least one digital line is detected with active digital service and if at least one analog line is detected with active analog service, receive line selection input, indicating which line is to be connected to provide a telephonic connection line, wherein the telephonic connection line is one selected from said at least one digital line detected with active digital service and from said at least one analog line detected with active analog service.

14. The device of claim 10 wherein the configuration module is further adapted to:
if at least two digital lines are detected with active digital service and if one analog line is detected with no active analog service, receive input indicating which line of the at least two digital lines detected with active digital service is to provide digital service for MTA service to said one analog line detected with no active analog service.

15. The device of claim 10 wherein the configuration module is further adapted to:
if there are more or equal number of digital lines detected with active digital service as compared to analog lines determined to have no active analog service, assign each of said analog lines determined to have no active analog service to a corresponding digital line selected for said more or equal number of digital lines detected with active digital service.

16. The device of claim 10 wherein the configuration module is further adapted to:
if a first analog line and a second analog line are each detected with no active analog service and if a first digital line and a second digital line are each detected with active digital service, assign the first analog line to the first digital line as a source to provide digital service for MTA service and assigning the second analog line to the second digital line as a source to provide digital service for MTA service.

17. A system comprising:
a device comprising:
an analog test module comprising a processor and an updated analog line status table, wherein the updated analog line status table comprises two or more accessible memory locations, the analog test module adapted to detect active analog service, comprising plain old telephone system (POTS) service, on an analog line;
a digital test module comprising a processor and an updated digital line status table, wherein the updated digital line status table comprises two or more accessible memory locations, the digital test module adapted to detect active digital service, comprising Voice-over-Internet Protocol (VoIP) service, on a digital line; and
a configuration module adapted to:
for said each analog line detected with active analog service, disable multimedia terminal adapter (MTA) service and enable said analog service on each of said analog line detected with active analog service;
disable said MTA service and disable digital service on each of said all digital lines detected with no active digital service if, based on the updated digital line status table, said active digital service is not detected on all said digital lines;
for said each digital line detected with active digital service, enable said digital service on each of said digital lines detected with active digital service; and
enable MTA service on said at least one analog line detected with no active service and associate, via setting an MTA mode, said at least one analog line detected with no active service with said at least one digital line detected with active digital service as a source of digital service for MTA service if, based on the updated line status table, at least one analog line is detected with no active analog service and if at least one digital line is detected with active digital service, and wherein the association establishes an operable connection between said at least one analog line detected with no active service and said at least one digital line detected with active digital service.

18. The system of claim 17 further comprising:
an on-premises phone wiring system operably coupled to the device;
at least one network segment operably coupled to the device, wherein the at least one network segment is adapted to provide Internet access; and
at least one analog telephony device operably coupled to the device via the on-premises phone wiring system and via at least one of said analog lines.

19. A method of configuring a device adapted to support multimedia terminal adapter (MTA) service, the device adapted to be operably connected to at least one analog line via a phone-wiring system and to be operably connected to at least one digital line, the method comprising the steps of:
updating a line status table, wherein content of the line status table is updated via:
for each analog line, detecting if analog service, comprising plain old telephone system (POTS) is active on said analog line; and
for each digital line, detecting if digital service, comprising Voice-over-Internet Protocol (VoIP) service, is active on said digital line; and
enabling said MTA service on said at least one analog line detected with no active analog service and associating, via setting an MTA mode, said at least one analog line detected with no active analog service with said at least one digital line detected with active digital service as a source of digital service for said MTA service if, based on the updated line status table, at least one analog line is detected with no active analog service and if at least one digital line is detected with active digital service, and wherein the associating establishes an operable connection between said at least one analog line detected with no active service and said at least one digital line detected with active digital service.

20. The method of claim 19 further comprising the step of:
placing a telephonic call via a telephonic device connected to the phone wiring system via a phone jack on said at least one analog line detected with no active analog service, wherein the at least one analog line detected with no active analog service supports an enabled MTA service and is associated with at least one digital line detected with active digital service as a source of digital service for said enabled MTA service.

* * * * *